(12) United States Patent
Nakada et al.

(10) Patent No.: US 10,823,675 B2
(45) Date of Patent: Nov. 3, 2020

(54) MICROSCOPE, OBSERVATION METHOD, AND A STORAGE MEDIUM

(71) Applicant: NIKON CORPORATION, Tokyo (JP)

(72) Inventors: Chieko Nakada, Tokyo (JP); Kumiko Matsui, Tokyo (JP); Wataru Tomosugi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 195 days.

(21) Appl. No.: 15/991,534

(22) Filed: May 29, 2018

(65) Prior Publication Data

US 2018/0306721 A1 Oct. 25, 2018

Related U.S. Application Data

(63) Continuation of application No. PCT/JP2015/083509, filed on Nov. 27, 2015.

(51) Int. Cl.

| | | |
|---|---|---|
| *G01N 21/64* | (2006.01) | |
| *G02B 21/16* | (2006.01) | |
| *G02B 21/08* | (2006.01) | |
| *G02B 21/12* | (2006.01) | |
| *G02B 21/06* | (2006.01) | |
| *H04N 5/225* | (2006.01) | |

(52) U.S. Cl.
CPC ......... *G01N 21/6458* (2013.01); *G01N 21/64* (2013.01); *G02B 21/06* (2013.01); *G02B 21/082* (2013.01); *G02B 21/125* (2013.01); *G02B 21/16* (2013.01); *H04N 5/225* (2013.01)

(58) Field of Classification Search
CPC .... G01N 21/64; G01N 21/6458; G02B 21/06; G02B 21/082; G02B 21/125; G02B 21/16; H04N 5/225
See application file for complete search history.

(56) References Cited

U.S. PATENT DOCUMENTS

| | | | |
|---|---|---|---|
| 2005/0179903 A1* | 8/2005 | Tsuruta | G01N 21/6458 356/445 |
| 2011/0115895 A1 | 5/2011 | Huisken | |
| 2012/0287244 A1* | 11/2012 | Bennett | G01N 21/6458 348/46 |

(Continued)

FOREIGN PATENT DOCUMENTS

| | | |
|---|---|---|
| JP | H9-159922 A | 6/1997 |
| JP | 2004-021222 A | 1/2004 |

(Continued)

OTHER PUBLICATIONS

Mar. 1, 2016 International Search Report issued in International Application No. PCT/JP2015/083509.

(Continued)

*Primary Examiner* — Cara E Rakowski
(74) *Attorney, Agent, or Firm* — Oliff PLC

(57) ABSTRACT

A microscope, including: an illumination optical system that irradiates a specimen with illumination light from an oblique direction; an observation optical system including an objective lens; and a controller that moves at least one of a stage to hold the specimen and the objective lens in a same direction as an optical axis of the objective lens. The controller changes, when moving at least one of the stage and the objective lens, an incident angle of the illumination light with respect to the specimen.

22 Claims, 14 Drawing Sheets

(56) References Cited

U.S. PATENT DOCUMENTS

2013/0265407 A1* 10/2013 Zur Nieden .............. G01J 1/58
348/80

FOREIGN PATENT DOCUMENTS

| JP | 2006-251209 A | 9/2006 |
|---|---|---|
| JP | 2007-072391 A | 3/2007 |
| JP | 2013-221960 A | 10/2013 |

OTHER PUBLICATIONS

Mar. 1, 2016 Written Opinion issued in International Patent Application No. PCT/JP2015/083509.

Sinko et al. "Ray tracing analysis of inclined illumination techniques." Optics Express, Aug. 11, 2014, vol. 22, No. 16, pp. 18940-18948.

Almada et al. "Palm and Storm: Into large fields and high-throughput microscopy with sCMOS detectors." Methods, 2015, pp. 109-121.

Boulanger et al. "Fast high-resolution 3D total internal reflection fluorescence microscopy by incidence angle scanning and azimuthal averaging." Proceedings of the National Academy of Sciences, Dec. 2, 2014, vol. 111, No. 48, pp. 17164-17169, with Supporting Information pp. 1-11.

Jul. 10, 2019 Extended European Search Report issued in European Patent Application No. EP 15909326.9.

"Live Acquisition Software Manual." TILL Photonics an FEI Company, Mar. 2012, v2.2.0, pp. 1-121.

Jun. 18, 2020 Office Action issued in European Patent Application No. 15 909 326.9.

Anonymous: "Fluorescence microscope—Wikipedia", Jan. 16, 2015 (Jan. 16, 2015), XP055701560, Retrieved from the Internet: URL: https://en.wikipedia.org/w/index.php?title=Fluorescence_microscope&oldid=642764297 [retrieved on Jun. 5, 2020].

* cited by examiner

MICROSCOPE, OBSERVATION METHOD, AND A STORAGE MEDIUM

CROSS REFERENCE TO RELATED APPLICATION

This is a Continuation of PCT Application No. PCT/JP2015/083509, filed on Nov. 27, 2015. The contents of the above-mentioned application are incorporated herein by reference.

FIELD OF THE INVENTION

The present invention relates to a microscope, an observation method, and a storage medium.

BACKGROUND

A microscope that illuminates a specimen from an oblique direction is known (for example, Japanese Patent Application Publication No. H9-159922).

In the microscope that illuminates a specimen from an oblique direction, it is desired to satisfactorily acquire a cross-sectional image of a thick specimen.

SUMMARY

A first aspect of the present invention provides a microscope, including: an illumination optical system that irradiates a specimen with illumination light from an oblique direction; an observation optical system including an objective lens; and a controller that moves at least one of a stage to hold the specimen and the objective lens in a same direction as an optical axis of the objective lens. The controller changes, when moving at least one of the stage and the objective lens, an incident angle of the illumination light with respect to the specimen.

A second aspect of the present invention provides a microscope, including: a stage on which a specimen is to be placed; an illumination optical system that irradiates the specimen with illumination light from an oblique direction; an observation optical system including an objective lens; a controller that moves at least one of the stage to hold the specimen and the objective lens in a same direction as an optical axis of the objective lens; an imaging device that images the specimen through the objective lens; and a memory that stores therein an imaging condition for each observation position in the optical axis direction of the objective lens. The imaging condition includes information related to an incident angle of the illumination light with respect to the specimen. The controller changes, when moving at least one of the stage and the objective lens, the incident angle of the illumination light with respect to the specimen based on the imaging condition.

A third aspect of the present invention provides an observation method using a microscope including: an illumination optical system that irradiates a specimen with illumination light from an oblique direction; and an observation optical system including an objective lens. The microscope is capable of moving at least one of a stage to hold the specimen and the objective lens in a same direction as an optical axis of the objective lens. The observation method includes changing, when moving at least one of the stage and the objective lens, an incident angle of the illumination light with respect to the specimen.

A fourth aspect of the present invention provides a storage medium storing therein a control program causing a computer to execute control of a microscope including: an illumination optical system that irradiates a specimen with illumination light from an oblique direction; and an observation optical system including an objective lens. The microscope is capable of moving at least one of a stage to hold the specimen and the objective lens in a same direction as an optical axis of the objective lens. The control includes changes, when moving at least one of the stage and the objective lens, an incident angle of the illumination light with respect to the specimen.

DESCRIPTION OF EMBODIMENTS

First Embodiment

Figure 1:
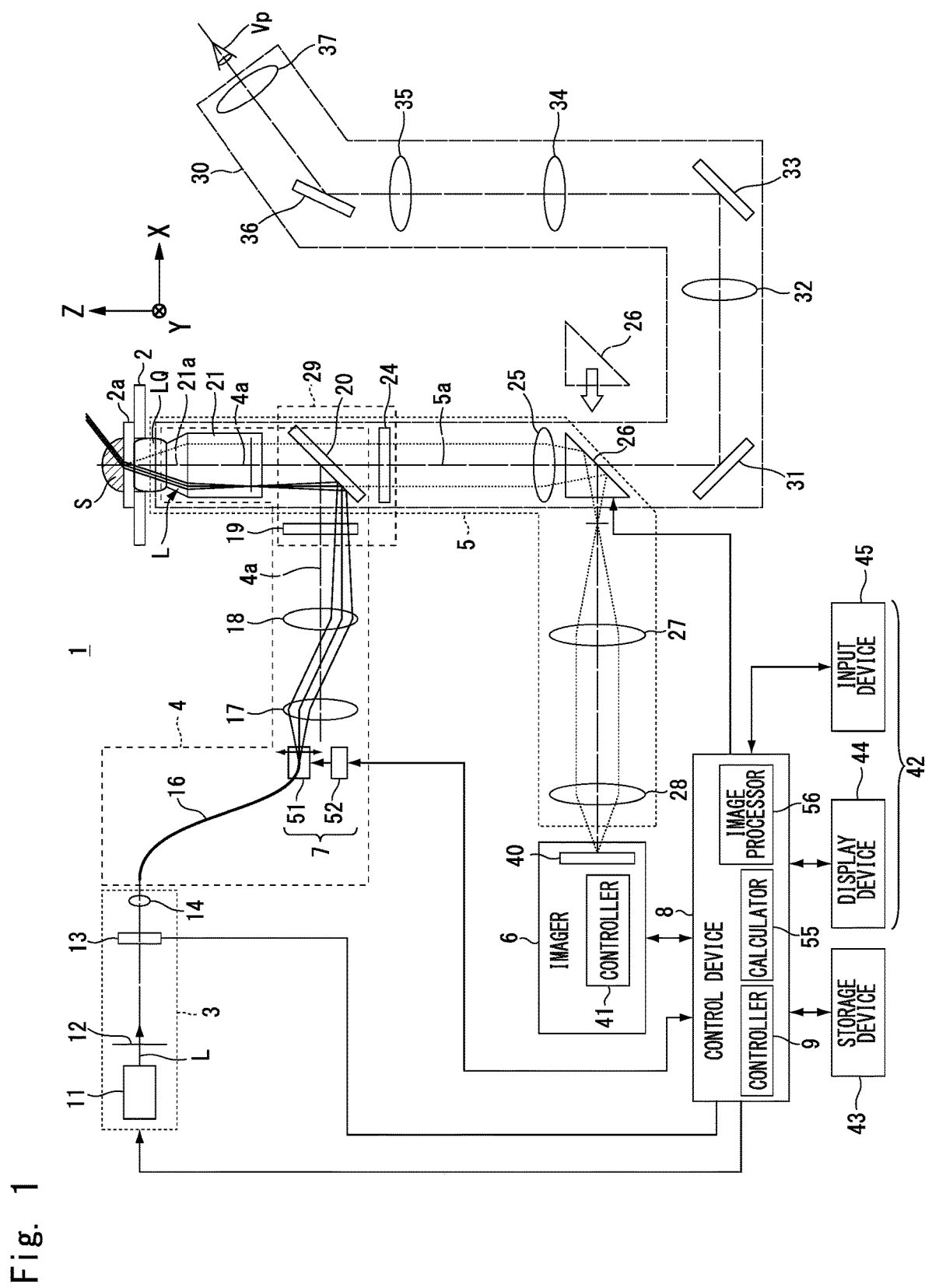
FIG. 1 is a diagram illustrating a microscope according to a first embodiment.

The following describes a first embodiment. FIG. 1 is a diagram illustrating a microscope 1 according to the first embodiment. The microscope 1 is a microscope capable of illuminating a specimen S to be observed and observing an image of the specimen S. For example, the microscope 1 is able to change an application angle of illumination light with respect to the specimen S. The case where the microscope 1 is a fluorescence microscope is described herein, but the microscope 1 may be a microscope other than the fluorescence microscope. The microscope 1 is able to observe the inside of the specimen S, and, for example, is able to generate an image (for example, Z-stack) obtained by stacking cross-sections of the specimen S in the thickness direction. The microscope 1 may be able to observe only one cross-section in the thickness direction of the specimen S.

The microscope 1 includes a stage 2, a light source device 3, an illumination optical system 4, a first observation optical system 5, an imager 6, an angle adjuster 7, and a control device 8. The control device 8 includes a controller 9 that comprehensively controls the parts in the microscope 1.

The stage 2 holds a specimen S to be observed. For example, the stage 2 is able to place a specimen S on its top surface. In an XYZ orthogonal coordinate system illustrated in FIG. 1 and other figures, an X direction and a Y direction are directions parallel to the top surface of the stage 2, and a Z direction is a direction perpendicular to the top surface of the stage 2. For example, the stage 2 may have a mechanism movable in the X direction, the Y direction, and the Z direction.

The light source device 3 includes a light source 11, a shutter 12, an acousto-optic element 13, and a lens 14. For example, the light source 11 includes a light emitting element such as a laser diode (LD) and a light emitting diode (LED). When the microscope 1 is used for fluorescence observation, the light source 11 emits illumination light L including excitation light to excite a fluorescent substance included in a specimen S. The shutter 12 is controlled by the controller 9, and is able to switching between the state in which illumination light L from the light source 11 is allowed to pass and the state in which the illumination light L is blocked. The acousto-optic element 13 is provided on the side of the shutter 12 to which the shutter 12 directs light. For example, the acousto-optic element 13 is an acousto-optic filter. The acousto-optic element 13 is controlled by the controller 9, and is able to adjust light intensity of the illumination light L. Furthermore, the acousto-optic element 13 is controlled by the controller 9, and is able to switch between the state in which the illumination light L passes through the acousto-optic element 13 (hereinafter referred to as "light passing state") and the state in which the illumination light L is blocked or the intensity thereof is reduced by the acousto-optic element 13 (hereinafter referred to as "light blocking state"). For example, the lens 14 is a coupler, and condenses the illumination light L from the acousto-optic element 13 onto a light guide member 16.

Note that the microscope 1 does not necessarily include at least a part of the light source device 3. For example, the light source device 3 may be unitized and provided in the microscope 1 in a replaceable (attachable, detachable) manner. For example, the light source device 3 may be attached to the microscope 1 when the microscope 1 is used for observation.

The illumination optical system 4 is able to obliquely irradiate the specimen S with illumination light L from the light source device 3. The illumination optical system 4 includes the light guide member 16, a lens 17, a lens 18, a filter 19, a dichroic mirror 20, and an objective lens 21. In FIG. 1 and other figures, the optical axis of the illumination optical system 4 is denoted with symbol 4a.

For example, the light guide member 16 is an optical fiber, and guides the illumination light L to the lens 17. For example, the lens 17 is a collimator, and converts the illumination light L into parallel light. For example, the lens 18 condenses the illumination light L to a pupil plane (rear focus plane) of the objective lens 21 or its neighborhood position. For example, the neighborhood of the pupil plane (rear focus plane) is within the range of ±10 mm from the pupil plane (rear focus plane). For example, the filter 19 has characteristics that transmits light in a wavelength band including the wavelength of excitation light (hereinafter referred to as "excitation wavelength") to excite a fluorescent substance included in the specimen S. The wavelength characteristics of the filter 19 are set such that at least a part of light having wavelengths other than the excitation wavelength is blocked. The dichroic mirror 20 has characteristics that reflect the illumination light L and transmit light (for example, fluorescence) in a predetermined wavelength band among light beams from the specimen S. Light from the filter 19 is reflected by the dichroic mirror 20 to enter the objective lens 21. For observation, a part of the specimen S is disposed on a front focus plane of the objective lens 21.

The above-mentioned illumination optical system 4 is an example, and is changeable as appropriate. For example, a part of the above-mentioned illumination optical system 4 may be omitted, and may be included in the light source device 3. The illumination optical system 4 may include at least a part of the light source device 3. The illumination optical system 4 may include an aperture stop or a field stop. An optical element closest to the specimen S in the illumination optical system 4 is the objective lens 21 in FIG. 1, but may be a prism or a mirror.

The first observation optical system 5 forms an image with light from the specimen S. For example, the first observation optical system 5 forms an image of fluorescence from a fluorescent substance included in the specimen S. The first observation optical system 5 includes an objective lens 21, a dichroic mirror 20, a filter 24, a lens 25, an optical path switching member 26, a lens 27, and a lens 28. The first observation optical system 5 shares the objective lens 21 and the dichroic mirror 20 with the illumination optical system 4. An optical axis 21a of the objective lens 21 is the same as the optical axis 4a of the illumination optical system 4, and is the same as the optical axis 5a of the first observation optical system 5. In the example illustrated in FIG. 1, the optical axis 21a of the objective lens 21 is the Z direction.

Fluorescence from the specimen S passes through the objective lens 21 and the dichroic mirror 20 to enter the filter 24. The filter 24 has characteristics that selectively transmit light in a predetermined wavelength band among light beams from the specimen S. The predetermined wavelength band is set to include the wavelength of fluorescence (hereinafter referred to as "fluorescence wavelength") from the specimen S. For example, the filter 24 blocks illumination light reflected by the specimen S, external light, and stray light. For example, the filter 24 is unitized with the filter 19 and the dichroic mirror 20, and this filter unit 29 is provided so as to be replaceable. For example, the filter unit 29 may be replaceable depending on the wavelength of illumination light L emitted from the light source device 3 or the wavelength of fluorescence exiting from the specimen S, or may use a single filter unit supporting a plurality of excitation wavelengths and fluorescence wavelengths.

Light that has passed through the filter 24 enters the optical path switching member 26 through the lens 25. Light that has exited from the lens 25 enters the optical path switching member 26. For example, the optical path switching member 26 is a prism, and is provided so as to be insertable to and removable from the optical path of the first observation optical system 5. For example, the optical path switching member 26 is inserted to and removed from the optical path of the first observation optical system 5 by a driver (not shown) controlled by the controller 9. In the state in which the optical path switching member 26 is inserted to the optical path of the first observation optical system 5, the optical path switching member 26 guides fluorescence from the specimen S to an optical path toward the imager 6 by internal reflection. Fluorescence from the specimen S passes through the optical path switching member 26, and then enters the imager 6 through the lens 27 and the lens 28. In the first observation optical system 5, for example, the objective lens 21 and the lens 25 form a primary image (for example, intermediate image) of the specimen S. In the first observation optical system 5, the lens 27 and the lens 28 form a secondary image (for example, final image) of the specimen S.

The above-mentioned first observation optical system 5 is an example, and is changeable as appropriate. For example, a part of the above-mentioned first observation optical system 5 may be omitted. The first observation optical system 5 may include an aperture stop or a field stop. The first observation optical system 5 may be provided independently from the illumination optical system 4, and, for example, may be provided on the side opposite to the objective lens 21 across the specimen S.

The microscope 1 according to the first embodiment includes a second observation optical system 30 used to set an observation range. The second observation optical system 30 includes, in order from the specimen S to a viewpoint Vp of an observer, an objective lens 21, a dichroic mirror 20, a filter 24, a lens 25, a mirror 31, a lens 32, a mirror 33, a lens 34, a lens 35, a mirror 36, and a lens 37. The second observation optical system 30 shares the configurations from the objective lens 21 to the lens 25 with the first observation optical system 5. Light from the specimen S passes through the lens 25, and then enters the mirror 31 in a state in which the optical path switching member 26 is retracted from the optical path of the first observation optical system 5. Light reflected by the mirror 31 enters the mirror 33 through the lens 32 to be reflected by the mirror 33, and then enters the mirror 36 through the lens 34 and the lens 35. Light reflected by the mirror 36 enters the viewpoint Vp through the lens 37. For example, the second observation optical system 30 forms an intermediate image of the specimen S on the optical path between the lens 35 and the lens 37. For example, the lens 37 is an eyepiece, and the observer is able to set an observation range by observing the intermediate image.

The imager 6 takes an image formed by the first observation optical system 5. The imager 6 includes an imaging sensor 40 and a controller 41. For example, the imaging sensor 40 is a CMOS image sensor, and may be a CCD image sensor. For example, the imaging sensor 40 has a plurality of pixels two-dimensionally arranged, and has a structure in which a photoelectric conversion element such as a photodiode is disposed in each pixel. For example, in the imaging sensor 40, charges accumulated in the photoelectric conversion element are read by a readout circuit. The imaging sensor 40 converts the read charges into digital data, and outputs data (for example, image data) in the digital form in which pixel positions and grayscale values are associated with one another. The controller 41 controls the imaging sensor 40 to operate based on a control signal input from the controller 9 for the control device 8, and outputs data on taken images to the control device 8. The controller 41 outputs a charge accumulation period and a charge reading period to the control device 8.

The microscope 1 includes an input/output device 42 and a storage device 43. The input/output device 42 is communicably connected to the control device 8 in a wired or wireless manner. The input/output device 42 includes a display device 44 (display, outputter) and an input device 45 (inputter). For example, the display device 44 is a liquid crystal display. For example, the display device 44 displays various kinds of images, such as images representing various settings of the microscope 1, images taken by the imager 6, and images generated from the taken images. The controller 9 controls the display device 44 to display various kinds of images on the display device 44. For example, the controller 9 supplies data on images generated by the image processor 56 to the display device 44, and displays the image on the display device 44. For example, the input device 45 is an inputter that is operable by the user, such as a keyboard, a mouse, and a trackball. For example, the input device 45 receives, from the user, inputs of various kinds of information such as observation conditions and operation commands for the parts in the microscope 1. The input device 45 supplies information input thereto to the control device 8. The input/output device 42 is not limited to the above-mentioned configuration, and for example, may be a touch panel in which the display and the inputter are integrated or may include another outputter (for example, printer) instead of the display device 44.

In the first embodiment, the microscope 1 is able to change an observation position on the specimen S in the direction of the optical axis 4a of the illumination optical system 4. The observation position on the specimen S is set to the position of the front focus plane of the objective lens 21 or its neighborhood. For example, the observation position on the specimen S is changeable by relatively moving the specimen S and the objective lens 21 in the direction of the optical axis 21a of the objective lens 21 (the optical axis 4a of the illumination optical system 4). For example, the observation position on the specimen S is changeable by moving the stage 2 having the specimen S placed thereon in the direction of the optical axis 21a of the objective lens 21. The observation position on the specimen S may be changed by moving the objective lens 21 in the direction of the optical axis. Specifically, the observation position on the specimen S may be changed by moving the stage 2, by moving the objective lens 21, or by moving both the stage 2 and the objective lens 21.

The angle adjuster 7 adjusts the angle of illumination light L applied from the illumination optical system 4 in accordance with an observation position of the specimen S in the direction of the optical axis 4a of the illumination optical system 4. For example, the angle adjuster 7 includes a holding member 51 and a driver 52. The holding member 51 holds an end of the light guide member 16 on the light exit side. The driver 52 is able to move the holding member 51 in a direction perpendicular to the optical axis 4a of the illumination optical system 4. The holding member 51 is provided on the pupil conjugate plane of the objective lens 21 or its neighborhood. The angle adjuster 7 is described in more detail later with reference to FIG. 2 and FIGS. 3A to 3C.

The control device 8 generally controls the parts in the microscope 1. The control device 8 includes a controller 9, a calculator 55, and an image processor 56. The controller 9 controls the driver 52 such that the driver 52 moves the holding member 51. In this manner, the incident angle of the illumination light L with respect to the specimen S (for example, the angle between the illumination light L and the optical axis 4a) is adjusted. The holding member 51 may be manually moved instead of moving the holding member 51 by the driver 52.

For example, the controller 9 supplies, based on a signal indicating a charge accumulation period and a charge reading period (information on imaging timing) supplied from the controller 41 for the imager 6, a control signal for switching between the light passing state that transmits light from the light source device 3 and the light blocking state that blocks light from the light source device 3 to the acousto-optic element 13. The acousto-optic element 13 switches between the light passing state and the light blocking state based on the control signal. Instead of the controller 9, the controller 41 may supply the acousto-optic element 13 with a control signal to switch between the light blocking state and the light passing state, based on the signal indicating the charge accumulation period and the charge reading period (information on imaging timing), so as to control the acousto-optic element 13.

The controller 9 controls the imager 6 such that the imaging sensor 40 executes imaging. The controller 9 acquires imaging results (data on taken images) from the imager 6. The image processor 56 uses the imaging results of the imager 6 to perform image processing. For example, the controller 9 changes the position of the stage 2 in the direction of the optical axis 21a of the objective lens 21, thereby changing the observation position on the specimen S. The controller 9 controls the imaging sensor 40 to take an image for each observation position and acquire taken images at a plurality of observation positions different in the direction of the optical axis 21a of the objective lens 21. For example, the image processor 56 is able to generate a three-dimensional image of the specimen S by using the taken images acquired.

Figure 2:
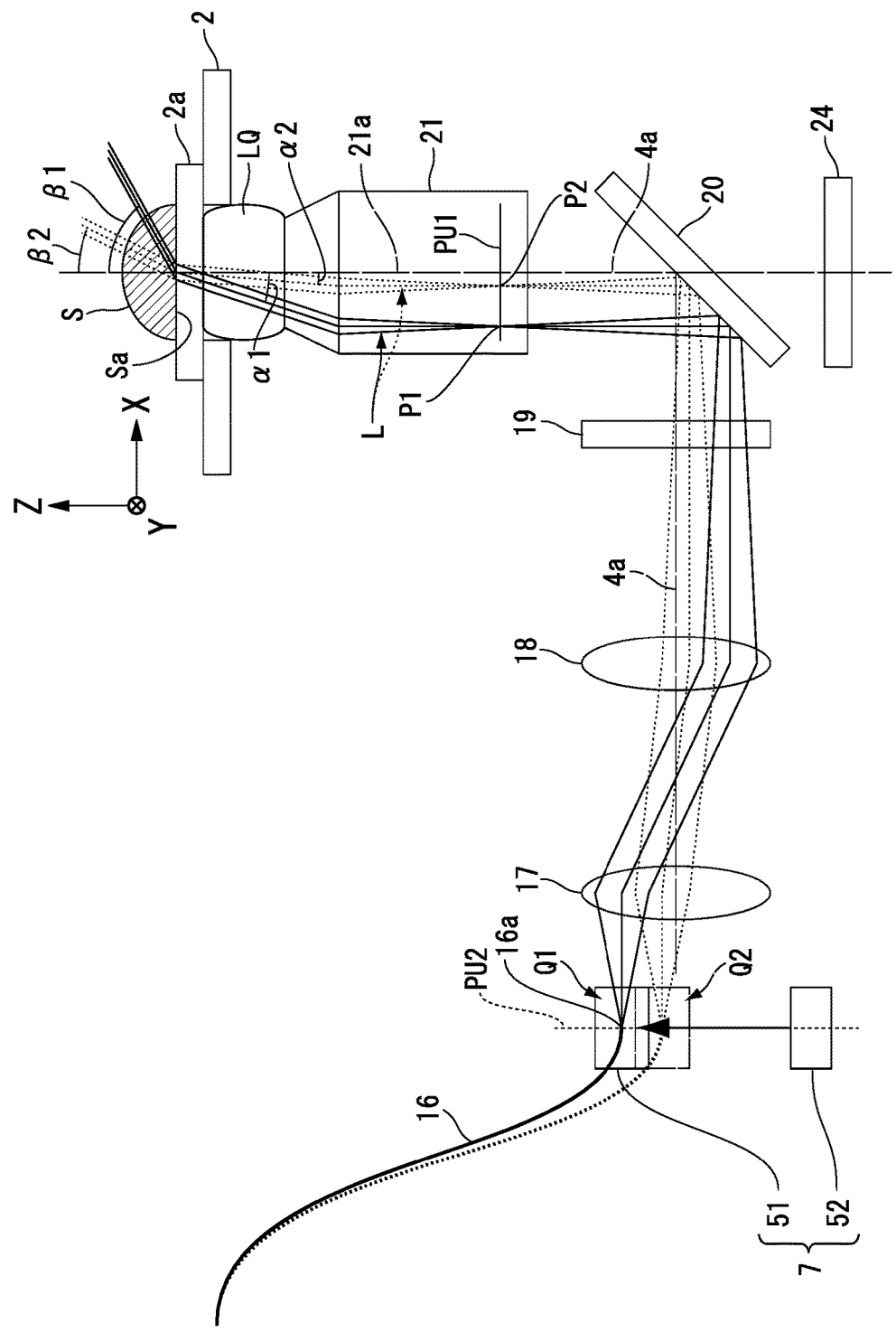
FIG. 2 is a diagram illustrating adjustment of the incident angle of illumination light with respect to a specimen, which is performed by an angle adjuster.

Next, the angle adjuster 7 is described. FIG. 2 is a diagram illustrating adjustment of the incident angle of the illumination light L to the specimen S by the angle adjuster 7. The angle adjuster 7 adjusts the incident angle of the illumination light L with respect to the specimen S. The incident angle of the illumination light L with respect to the specimen S is an angle formed by the optical axis 21a of the objective lens 21 (the optical axis 4a of the illumination optical system 4) and a direction in which the illumination light L enters the specimen S (such as $\alpha 1$ and $\alpha 2$ in FIG. 2). When the incident angle (such as $\alpha 1$ and $\alpha 2$ in FIG. 2) of the illumination light L with respect to the specimen S changes, an angle (such as $\beta 1$ and $\beta 2$ in FIG. 2) formed by the optical axis of the objective lens 21 (the optical axis 4a of the illumination optical system 4) and the illumination light L that illuminates (passes through) the specimen S also changes. An example where the angle adjuster 7 decreases the incident angle of the illumination light L with respect to the specimen S (from $\alpha 1$ to $\alpha 2$) is now described, but the angle adjuster 7 may increase the incident angle.

A light source image that is almost regarded as a point light source is formed at an end 16a of the light guide member 16 on the light exit side. The end 16a of the light guide member 16 is disposed by the holding member 51 at the position of a pupil conjugate plane PU2 that is conjugate with the pupil plane PU1 of the objective lens 21 or the neighborhood of the pupil conjugate plane PU2. In this case, before the angle of the illumination light L is adjusted, the holding member 51 is disposed at a position Q1 on a pupil conjugate plane PU2. The illumination light L that has exited from the light guide member 16 enters an incident position P1 on the pupil plane PU1 of the objective lens 21, and then enters the specimen S at the angle $\alpha 1$. In this case, the specimen S is placed on a transparent member 2a such as cover glass, and the transparent member 2a is supported by the stage 2. Space between the lower surface of the transparent member 2a and the end surface of the objective lens 21 is filled with an immersion liquid LQ. For example, the refractive index of the immersion liquid LQ is substantially the same as the refractive index of the transparent member 2a. When the refractive index of the specimen S is different from the refractive index of the transparent member 2a having the specimen S placed thereon, the illumination light L is refracted at an interface Sa between the specimen S and the transparent member 2a as illustrated in FIG. 2. In this case, an angle formed by the illumination light L that has entered the specimen S at the angle $\alpha 1$ and been refracted at the interface Sa between the specimen S and the transparent member 2a and the optical axis 21a of the objective lens 21 (the optical axis 4a of the illumination optical system 4) is represented by $\beta 1$.

To decrease the angle of the illumination light L, the driver 52 moves the holding member 51 holding the end 16a of the light guide member 16 to a position Q2 that is closer to the optical axis 4a than the position Q1 is. In this manner, the incident position of the illumination light L on the pupil plane PU1 of the objective lens 21 changes to an incident position P2 that is closer to the optical axis 4a than the incident position P1 is, and the angle of the illumination light changes to $\alpha 2$ that is smaller than $\alpha 1$. In this case, an angle formed by the illumination light L that has entered the specimen S at the angle $\alpha 2$ and been refracted at the interface Sa and the optical axis 4a is represented by $\beta 2$. Because $\alpha 2$ is smaller than $\alpha 1$, $\beta 2$ is smaller than $\beta 1$.

Figure 3A:
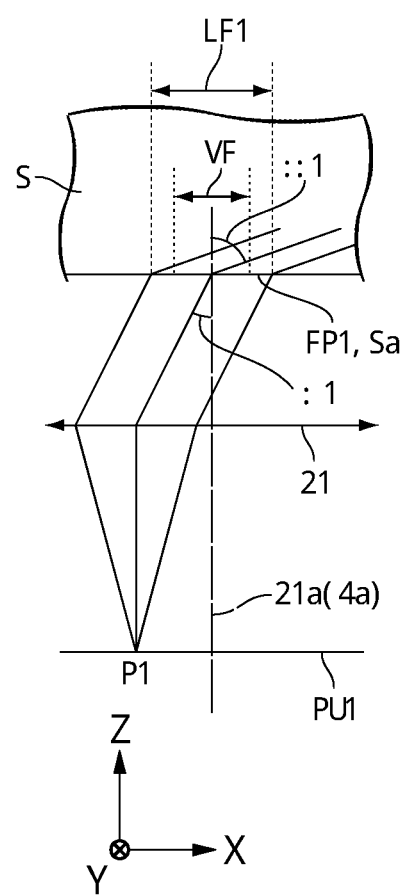
FIGS. 3A to 3C are each a diagram illustrating an illumination field of an illumination optical system and a visual field of an observation optical system.
Figure 3B:
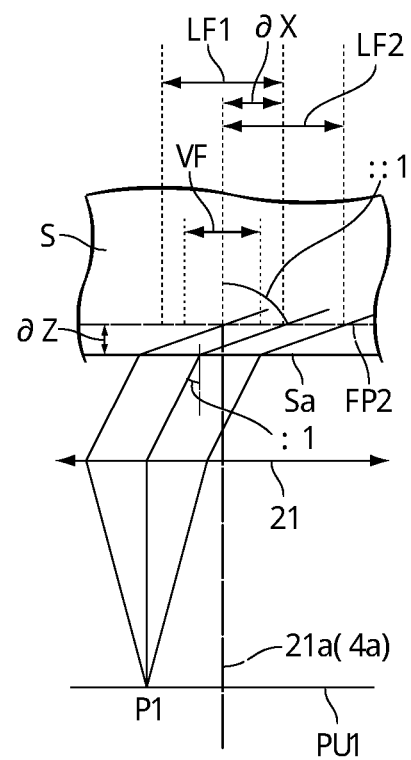
Figure 3C:
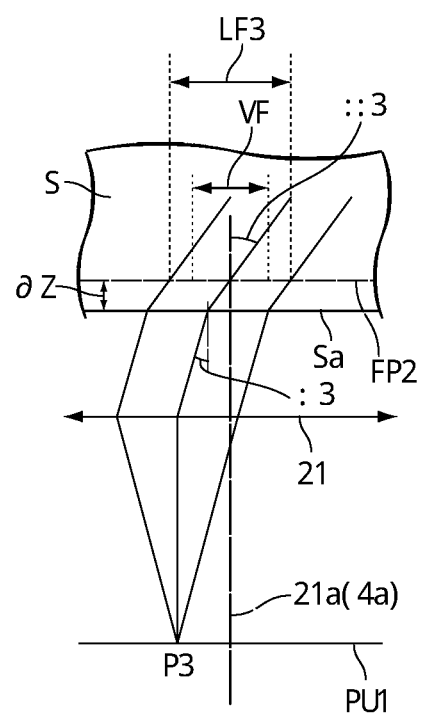

FIGS. 3A to 3C are each a diagram illustrating an illumination field of the illumination optical system and a visual field of the observation optical system. In this case, the observation position on the specimen S is the same position as the front focus plane of the objective lens 21. For the sake of convenience, the case where illumination light L is condensed on the pupil plane PU1 of the objective lens 21 is exemplified below, but the illumination light L is not necessarily required to be condensed on the pupil plane PU1 of the objective lens 21. For example, the illumination light L may be condensed on the neighborhood of the pupil plane PU1. In FIG. 3A, a front focus plane FP1 of the objective lens 21 is set at the same position as the interface Sa between the specimen S and the transparent member 2a. Illumination light L condensed on the incident position P1 on the pupil plane PU1 of the objective lens 21 becomes parallel light to illuminate the specimen S, and forms an illumination field LF1 on an interface Sa between the specimen S and the transparent member 2a. For example, the illumination field LF1 is formed around the optical axis 21a of the objective lens 21 (optical axis 4a). For example, a visual field VF (for example, the observation range on the specimen S) of the first observation optical system 5 (see FIG. 1) is formed around the optical axis 21a of the objective lens 21 (optical axis 4a). For example, an illumination field LF is formed in a region in which the entire visual field VF is included.

FIG. 3B illustrates the appearance after the stage 2 is made closer to the objective lens 21 from the state in FIG. 3A, for example. In FIG. 3B, a front focus plane FP2 of the objective lens 21 is set at a position (inside the specimen S) away from the interface Sa between the specimen S and the transparent member 2a in the direction of the optical axis 21a of the objective lens 21 (optical axis 4a). Illumination light L condensed on the pupil plane PU1 of the objective lens 21 becomes parallel light to form an illumination field LF2 on the front focus plane FP2. Illumination light L that has entered the specimen S is refracted by the interface Sa between the specimen S and the transparent member 2a to have an angle $\beta 1$ with the optical axis 21a of the objective lens 21 (optical axis 4a) and have a gap ($\Delta Z$) between the interface Sa between the specimen S and the transparent member 2a and the front focus plane FP2. Thus, the illumination field LF2 moves in the +X direction from the illumination field LF1 by a movement amount $\Delta X$. The movement amount $\Delta X$ is an amount that depends on a distance $\Delta Z$ between the interface Sa between the specimen S and the transparent member 2a and the front focus plane FP2, and on the angle $\beta 1$. As the distance $\Delta Z$ becomes larger or the angle $\beta 1$ becomes larger, the movement amount $\Delta X$ becomes larger. As the movement amount $\Delta X$ becomes larger, the area where the illumination field LF2 and the visual field VF overlap with each other becomes smaller, and it becomes more difficult to satisfactorily acquire an image of the specimen S. Thus, the angle adjuster 7 illustrated in FIG. 2 adjusts the incident angle of the illumination light L with respect to the specimen S in accordance with an observation position of the specimen S (the front focus plane of the objective lens 21) in the direction of the optical axis 21a of the objective lens 21 (optical axis 4a).

In FIG. 3C, the front focus plane FP2 of the objective lens 21 is set to the same position as in FIG. 3B. For example, the angle adjuster 7 (see FIG. 2) adjusts an incident position (condensing position) of the illumination light L on the pupil plane PU1 of the objective lens 21 to the incident position P3 in accordance with the position of the front focus plane FP2 of the objective lens 21. The incident position P3 is set closer to the optical axis 21a of the objective lens 21 (optical axis 4a) than the incident position P1 in FIG. 3B is. Illumination light L condensed at the incident position P3 becomes parallel light to be directed to the specimen S. An angle α3 of the illumination light L toward the specimen S (the incident angle of the illumination light L with respect to the specimen S) is smaller than the angle α1 in FIG. 3B, and an angle of illumination light L refracted by the interface Sa between the specimen S and the transparent member 2a (the angle between the illumination light L refracted by the interface Sa and the optical axis 21a of the objective lens 21 (optical axis 4a)) β3 is smaller than the angle β1 in FIG. 3B. Thus, the illumination field LF3 moves in the −X direction from the illumination field LF2 in FIG. 3B. In this manner, the area in which the illumination field LF3 and the visual field VF overlap with each other is increased as compared with FIG. 3B, and an image of the specimen S is able to be satisfactorily acquired.

For example, the angle adjuster 7 illustrated in FIG. 2 adjusts the incident position P in accordance with a distance ΔZ from the interface Sa between the specimen S and the transparent member 2a to the observation position (the front focus plane FP2 of the objective lens 21) in the direction of the optical axis 21a of the objective lens 21 (optical axis 4a). For example, the angle adjuster 7 moves the incident position P of the illumination light L so as to be closer to the optical axis 21a of the objective lens 21 (optical axis 4a) as the front focus plane FP2 of the objective lens 21 becomes away from the interface Sa between the specimen S and the transparent member 2a (as ΔZ becomes larger). Specifically, when the stage 2 is moved along the optical axis 21a of the objective lens 21 so as to approach the objective lens 21, a deep part (in this case, a part away in the direction in which the distance from the interface Sa increases) of the specimen S becomes an observation position. In this case, as described above, if the incident angle of the illumination light L with respect to the specimen S is maintained constant, the area in which the illumination field and the visual field overlap with each other is reduced. Thus, at the same time when the stage 2 is moved along the optical axis, the controller 9 controls the driver 52 for the angle adjuster 7 and the driver 52 moves the holding member 51 such that the incident position P approaches the optical axis 21a of the objective lens 21 (optical axis 4a). Also when the objective lens 21 is moved along the optical axis so as to approach the stage 2, the deep part of the specimen S is similarly an observation position. Also in this case, similarly, at the same time when the objective lens 21 is moved along the optical axis, the controller 9 controls the driver 52 for the angle adjuster 7 and the driver 52 moves the holding member 51 such that the incident position P approaches the optical axis 21a of the objective lens 21 (optical axis 4a).

In the first embodiment, the calculator 55 illustrated in FIG. 1 calculates a target value of an incident position (for example, the incident position P3 in FIGS. 3A to 3C) for a position of the front focus plane FP of the objective lens 21 in the specimen S. The controller 9 controls the angle adjuster 7 based on the calculation result of the calculator 55. For example, the calculator 55 calculates a target value of the incident position of illumination light L on the pupil plane PU1 based on information input through the input device 45.

Figure 4A:
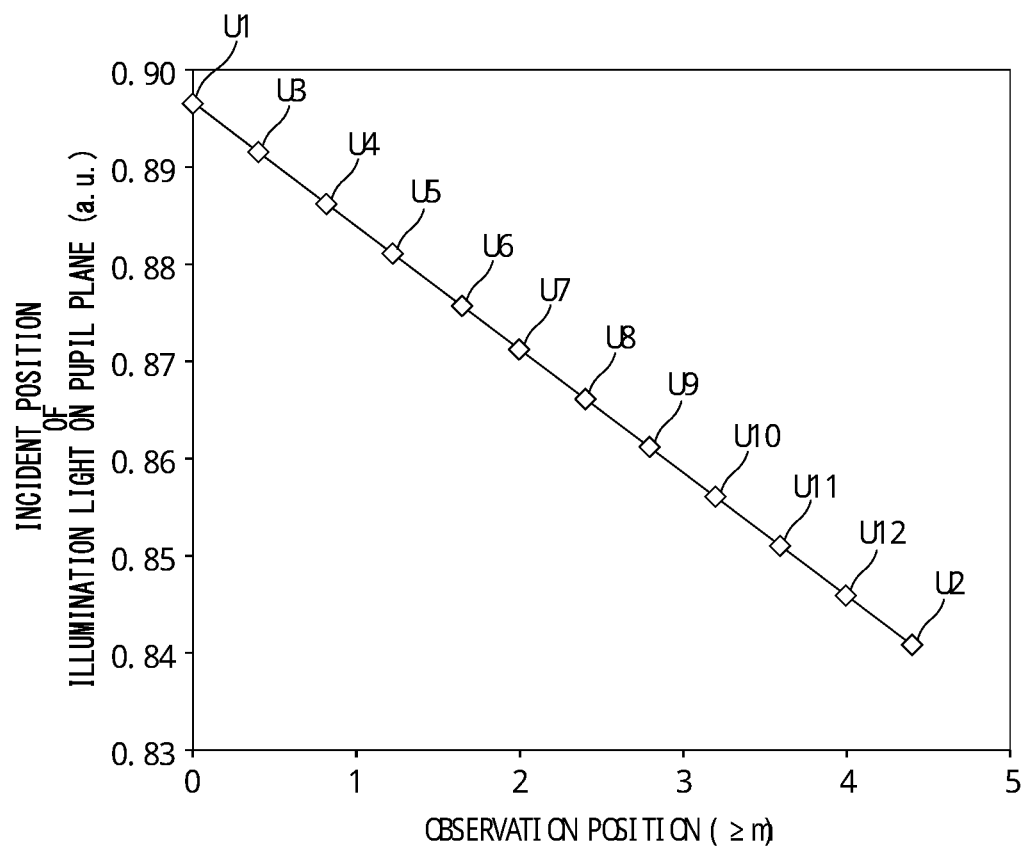
FIGS. 4A and 4B are each a diagram illustrating a relation between an observation position and an incident angle, which is calculated by a calculator according to the first embodiment.

FIG. 4A is a diagram illustrating a relation between an observation position and an incident angle, which is calculated by the calculator 55 according to the first embodiment. For example, the calculator 55 uses two or more pairs of observation positions (the position of the front focus plane FP of the objective lens 21 in the specimen S) and incident positions P of illumination light L designated by the user to calculate target values of incident positions P of illumination light L corresponding to other observation positions. In FIG. 4A, the horizontal axis represents the observation position (unit is μm) with the interface Sa between the specimen S and the transparent member 2a being a reference (0 μm) and the inside of the specimen S being positive. In FIG. 4A, the vertical axis represents the value indicating the incident position P of the illumination light L on the pupil plane PU1, and the unit thereof is an arbitrary unit (a.u.). Here, an example where the incident position P is normalized by the movable range of the holding member 51 is illustrated. Symbol U1 represents a target value (about 0.897) of an incident position P corresponding to a first observation position (for example, about 0 μm) designated by the user. Symbol U2 represents a target value of an incident position P (for example, about 0.841) corresponding to a second observation position (for example, about 4.5 μm) designated by the user. For example, the calculator 55 calculates a target value of an incident position P corresponding to a third observation position between the first observation position and the second observation position by interpolation between the plot U1 and the plot U2. Specifically, in FIG. 4A, the calculator 55 uses linear interpolation to linearly interpolate U3 to U12. In the above, the user designates U1 and U2, and the section between U1 and U2 is interpolated, but for example, the user may designate U5 and U10, and the calculator 55 may calculate U1 to U4, U6 to U9, and U11 and U12. The number of observation positions is appropriately set depending on observation conditions.

Figure 4B:
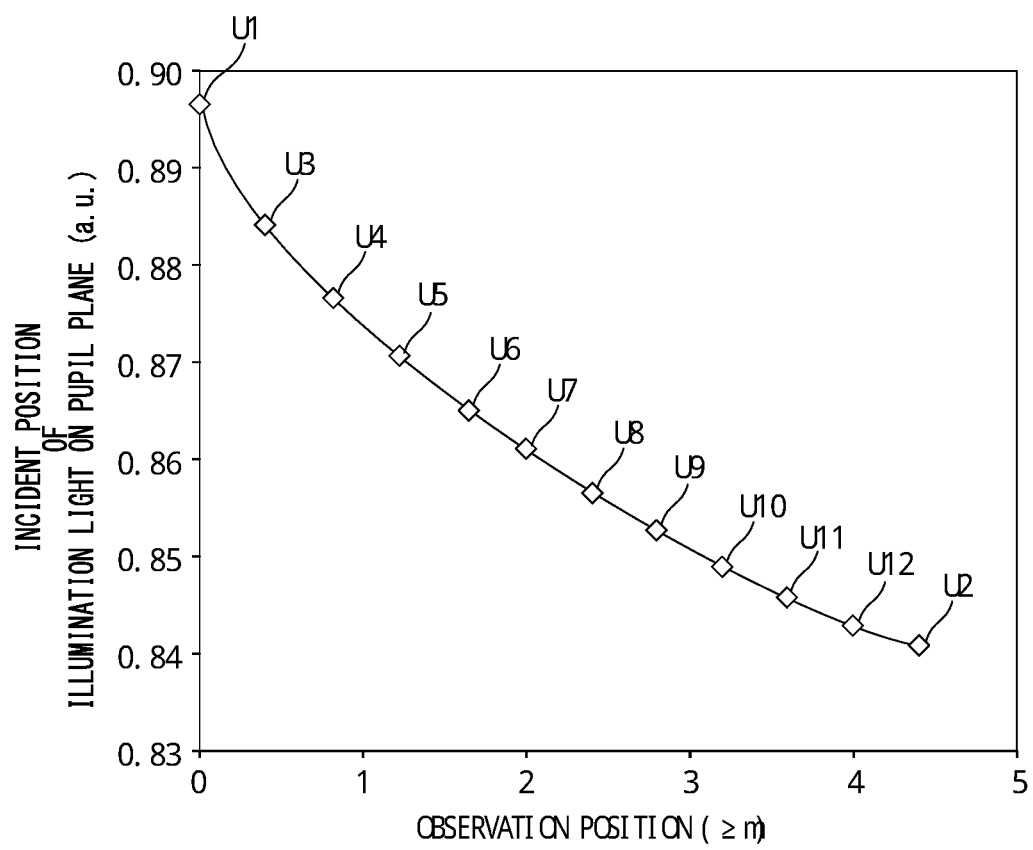

FIG. 4B is a diagram illustrating another example of the operation of the calculator 55 according to the first embodiment. In the present example, the calculator 55 calculates an incident position P of illumination light L on the pupil plane PU1 by non-linear interpolation. For example, the calculator 55 interpolates the section between the plots U1 and U2 such that the plots U1 and U2 are ends and the plots U1 to U12 are disposed on a curve convex downward. For example, the calculator 55 calculates the plots U3 to U12 by using an interpolation method (for example, γ interpolation) in which a target value of the incident position is presented by a function form including the exponent of the observation position. The interpolation method used by the calculator 55 is not limited to the above-mentioned example, and an interpolation method for obtaining a line distribution. The controller 9 may output a plurality of calculation methods for information related to the incident angle corresponding to the position of the objective lens 21 to the input/output device 42 such that the calculation methods are selectable. For example, the controller 9 may display a plurality of candidates for the interpolation method (for example, linear interpolation and γ interpolation) on the display device 44, and the user may operate the input device 45 to select the interpolation method to be used from among the candidates. The calculator 55 may calculate information related to the incident angle corresponding to the position of the objective lens 21 based on a calculation method input from the input/output device 42, and the controller 9 may change the incident angle based on the information calculated by the calculator 55. The controller 9 may output a plurality of calculation methods for information related to the incident angle corresponding to the position of the stage 2 to the input/output device 42 such that the calculation methods are selectable, the calculator 55 may calculate information related to the incident angle corresponding to the position of the stage 2 based on a calculation method input from the input/output device 42, and the controller 9 may change the incident angle based on the information calculated by the calculator 55.

In FIGS. 4A and 4B referred to above, the horizontal axis represents the observation position with the interface Sa between the specimen S and the transparent member 2a being a reference (0 μm) and the inside of the specimen S being positive, but may be the position of the stage 2 or the position of the objective lens 21. The user designates a first observation position and a target value of a corresponding incident position P and a second observation position and a target value of a corresponding incident position P. The calculator 55 may acquire the position of the stage 2 (first stage position) corresponding to the first observation position and the position of the stage 2 (second stage position) corresponding to the second observation position, and may associate the first stage position and a target value of a corresponding incident position P with each other and the second stage position and a target value of a corresponding incident position P with each other. In this case, the calculator 55 calculates a target value of the incident position P corresponding to the position of the stage 2. In this case, in FIGS. 4A and 4B referred to above, the horizontal axis may be an absolute coordinate position of the stage 2 or may be set with reference to the first stage position. Similarly, the user designates a first observation position and a target value of a corresponding incident position P and a second observation position and a target value of a corresponding incident position P. The calculator 55 may acquire the position of the objective lens 21 (first objective lens position) corresponding to the first observation position and the position of the objective lens 21 (second objective lens position) corresponding to the second observation position, and may associate the first objective lens position and a target value of a corresponding incident position P with each other and the second objective lens position and a target value of a corresponding incident position P with each other. In this case, the calculator 55 calculates a target value of the incident position P corresponding to the position of the objective lens 21. In this case, in FIGS. 4A and 4B referred to above, the horizontal axis may be an absolute coordinate position of the objective lens 21 or may be set with reference to the first objective lens position.

The controller 9 controls the angle adjuster 7 based on the calculation result of the calculator 55. In this case, the controller 9 controls the angle adjuster 7 by using the position of the holding member 51 with respect to the incident position P, which is stored in the storage device 43 in advance.

In FIGS. 4A and 4B referred to above, the horizontal axis is the incident position P of the illumination light L on the pupil plane PU1, but may be the position of the holding member 51. In this case, the user designates the first observation position and a corresponding position of the holding member 51 and designates the second observation position and a corresponding position of the holding member 51, and the calculator 55 calculates the positions of the holding member 51 corresponding to the observation positions. In this case, it is unnecessary to store the position of the holding member 51 corresponding to the incident position P in the storage device 43 in advance.

The controller 9 may change the incident angle based on information related to the incident angle corresponding to the position of the objective lens 21 (hereinafter referred to as "first reference information"). For example, the first reference information may be information related to an incident angle associated with absolute position information on the objective lens 21. For example, the absolute position information is information on the position of the objective lens 21 with respect to a predetermined reference position, and is coordinates of the objective lens 21 in the direction of the optical axis 21a of the objective lens 21 (Z direction). For example, the reference position is determined by the controller 9 upon the power-on of the microscope 1. In this case, as the first reference information, for example, a function (for example, mathematical formula, numerical table) indicating the relation between the absolute position of the objective lens 21 and the incident angle is usable. The first reference information may be information related to an incident angle associated with the movement amount of the objective lens 21. In this case, as the first reference information, for example, a function (for example, mathematical formula, numerical table) indicating the relation between the movement amount of the objective lens 21 and the incident angle is usable. The first reference information may be information related to an incident angle associated with relative position information on the objective lens 21 with respect to the stage 2. For example, the relative position information is information on a difference between the coordinates of the stage 2 and the coordinates of the objective lens 21 in the direction of the optical axis 21a of the objective lens 21 (Z direction). In this case, as the first reference information, for example, a function (for example, mathematical formula, numerical table) indicating the relation between the absolute position of the objective lens 21 with reference to the position of the stage 2 and the incident angle is usable.

The controller 9 may change the incident angle based on information related to the incident angle corresponding to the position of the stage 2 (hereinafter referred to as "second reference information"). For example, the second reference information may be information related to an incident angle associated with absolute position information on the stage 2. For example, the absolute position information is information on the position of the stage 2 with respect to a predetermined reference position, and is coordinates of the stage 2 in the direction of the optical axis 21a of the objective lens 21 (Z direction). For example, the reference position is determined by the controller 9 upon the power-on of the microscope 1. In this case, as the second reference information, for example, a function (for example, mathematical formula, numerical table) indicating the relation between the absolute position of the stage 2 and the incident angle is usable. The second reference information may be information related to an incident angle associated with the movement amount of the stage 2. In this case, as the second reference information, for example, a function (for example, mathematical formula, numerical table) indicating the relation between the movement amount of the stage 2 and the incident angle is usable. The second reference information may be information related to an incident angle associated with relative position information on the stage 2 with respect to the objective lens 21. For example, the relative position information is information on a difference between the coordinates of the stage 2 and the coordinates of the objective lens 21 in the direction of the optical axis 21a of the objective lens 21 (Z direction). In this case, as the second reference information, for example, a function (for example, mathematical formula, numerical table) indicating the relation between the absolute position of the stage 2 with reference to the position of the objective lens 21 and the incident angle is usable.

Figure 5:
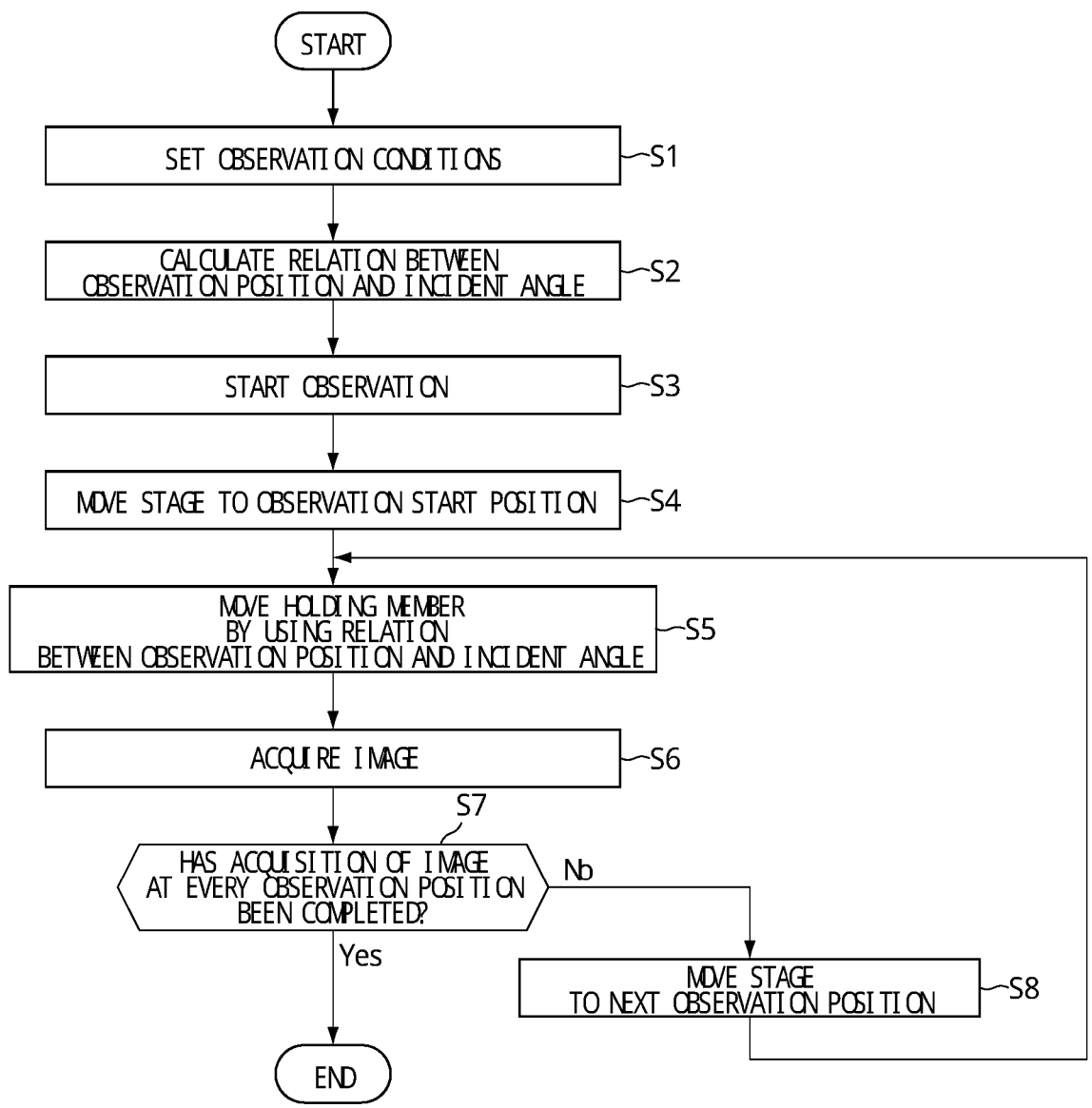
FIG. 5 is a flowchart illustrating an example of an observation method according to an embodiment.

Now, an observation method according to the present embodiment is described based on the configuration of the above-mentioned microscope 1. FIG. 5 is a flowchart illustrating an example of the observation method according to the embodiment. First, in Step S1, a user uses the input device 45 to set observation conditions. Examples of the observation conditions include the first observation position (the lower limit of the observation position) and a corresponding incident position, the second observation position (the upper limit of the observation position) and a corresponding incident position, and the number of observation positions in the optical axis direction of the objective lens 21. In this case, the user determines optimum incident positions for the first observation position and the second observation position based on the contrast, the light intensity, and the like of a plurality of images taken by moving the holding member 51 and changing the incident position. For example, the above-mentioned observation conditions may be stored in the memory 43 in advance.

In Step S2, the calculator 55 calculates the relation between the observation position and the incident position. For example, the calculator 55 uses a first observation position and a second observation position defined by the observation conditions and the number of observation positions in the optical axis direction of the objective lens 21 to calculate an observation position between the first observation position and the second observation position. For example, as illustrated in FIGS. 4A and 4B, the calculator 55 uses the incident position for the first observation position and the incident position for the second observation position to calculate incident positions for observation positions therebetween.

In Step S3, the microscope 1 starts the operation for observation in response to an instruction from the user, for example. In Step S4, the controller 41 controls the stage 2 such that the stage 2 is moved to a position corresponding to the first observation position. In Step S5, the controller 41 uses the relation between the observation position and the incident angle to move the holding member 51. In Step S6, the controller 41 controls the imager 6 to take an image formed by the first observation optical system 5 to acquire the image in the state in which the specimen S is irradiated with illumination light from the illumination optical system 4. In Step S7, the controller 41 determines whether the image acquisition has been completed for every observation position. When the controller 41 determines in Step S1 that some observation positions set for the observation conditions are not completed (No in Step S7), in Step S8, the controller 41 moves the stage 2 to a position corresponding to the next observation position, and repeats the processing from Step S5 to Step S7. When the controller 41 determines that the acquisition of images for all observation positions is completed (Yes in Step S7), the controller 41 finishes the series of processing. In the above, the calculator 55 calculates the relation between the observation position and the incident position in Step S2, but the relation between the observation position and the incident position may be stored in the storage device 43 in advance. In this case, Step S2 is omitted.

Second Embodiment

The following describes a second embodiment. In the second embodiment, the same configurations as those in the above-mentioned embodiment are denoted with the same reference numerals, and the descriptions thereof are omitted or simplified. In the second embodiment, the configuration of the microscope 1 is the same as in FIG. 1, but the operation of the calculator 55 is different from that in the first embodiment.

Figure 6:
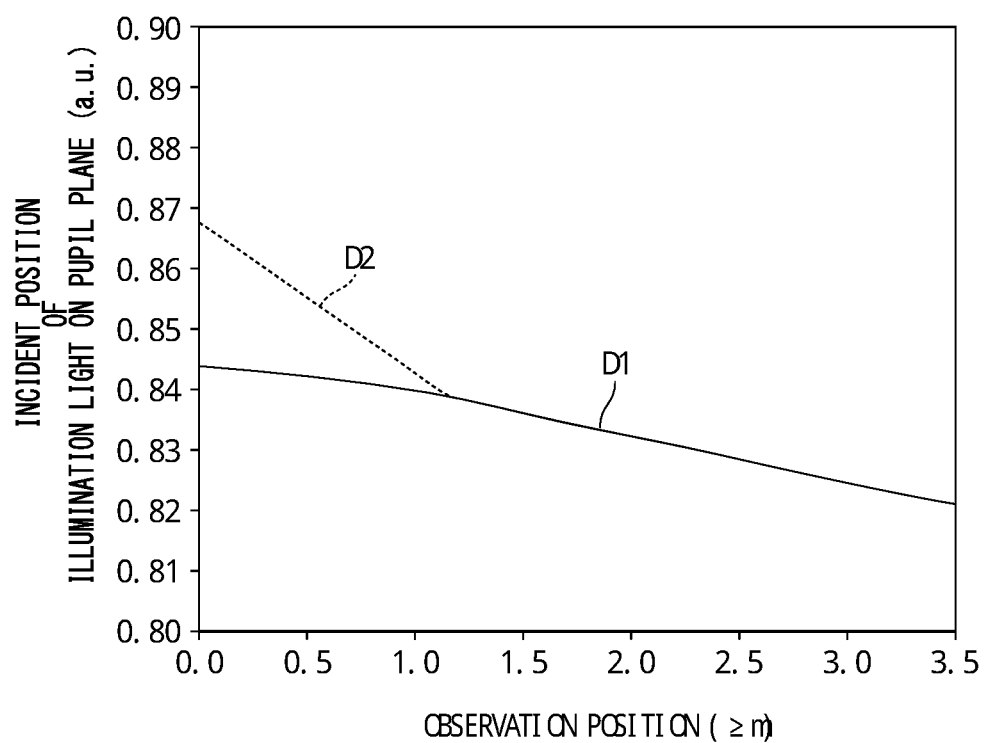
FIG. 6 is a diagram illustrating a relation between an observation position and an incident angle, which is calculated by a calculator according to a second embodiment.

FIG. 6 is a diagram illustrating the relation between the observation position and the incident angle, which is calculated by the calculator 55 according to the second embodiment. In the second embodiment, unlike the first embodiment, a user does not need to designate a pair of an observation position (the position of the front focus plane FP of the objective lens 21 in the specimen S) and an incident position P of illumination light L, and the calculator 55 calculates the relation between the observation position and a target value of the incident position P based on predetermined observation conditions as indicated by symbol D1 in FIG. 6. Examples of the above-mentioned observation conditions include the refractive index between the specimen S and the objective lens 21 (for example, the refractive index of a transparent member, the refractive index of an immersion liquid), the refractive index of the specimen S, the type of the objective lens, the environmental temperature, and the thickness of the cover glass 2a. When the user designates an observation position (the position of the front focus plane FP of the objective lens 21 in the specimen S) and an incident position P of illumination light L, the user needs to change the incident angle P at the observation position to acquire a plurality of images for determining an optimum incident position P, but in the second embodiment, such a burden is able to be eliminated. For example, in consideration of influence of aberration and evanescent field, the calculator 55 may calculate the relation as indicated by symbol D2 in FIG. 6 for a region near the interface Sa between the specimen S and the transparent member 2a.

Third Embodiment

The following describes a third embodiment. In the third embodiment, the same configurations as those in the above-mentioned embodiments are denoted with the same reference numerals, and the descriptions thereof are omitted or simplified. In the third embodiment, the configuration of the microscope 1 is the same as in FIG. 1, but the operation of the calculator 55 is different from that in the first embodiment.

In the first embodiment, a user designates a pair of an observation position (the position of the front focus plane FP of the objective lens 21 in the specimen S) and an incident position P of illumination light L (such as symbols U1 and U2), but in the third embodiment, the user does not need to designate the incident position P. In other words, the user designates an observation position (the position of the front focus plane FP of the objective lens 21 in the specimen S), and the calculator 55 calculates the relation between the observation position and the incident position P. For example, when the first observation position is designated by the user, the controller 9 controls the driver 52 to move the holding member 51, and controls the imager 6 to take a plurality of images of the specimen S illuminated at different incident positions P for the designated observation position. The calculator 55 determines a target value of the incident position P corresponding to the first observation position input by the user based on information related to light from the specimen S detected every time the incident position P is changed. For example, the calculator 55 determines an incident position P at which the intensity or the contrast of light from the specimen S is the highest as a target value of the incident position P for the first observation position. Similarly, the calculator 55 calculates a target value of the incident position P for the second observation position. In addition, the calculator 55 may similarly calculate target values of incident positions P for observation positions (for example, U3 to U12) other than the first observation position and the second observation position based on information related to light from the specimen S detected every time the incident position P is changed. In this case, the relation between the observation positions and the incident positions P is able to be calculated more accurately than when U3 to U12 are linearly interpolated from U1 and U2. In the first embodiment, the user needs to designate a target value of an incident position P corresponding to an observation position, but in the third embodiment, the calculator 55 calculates an incident position P corresponding to an observation position designated by the user, and hence the burden on the user is able to be eliminated.

Fourth Embodiment

Figure 7:
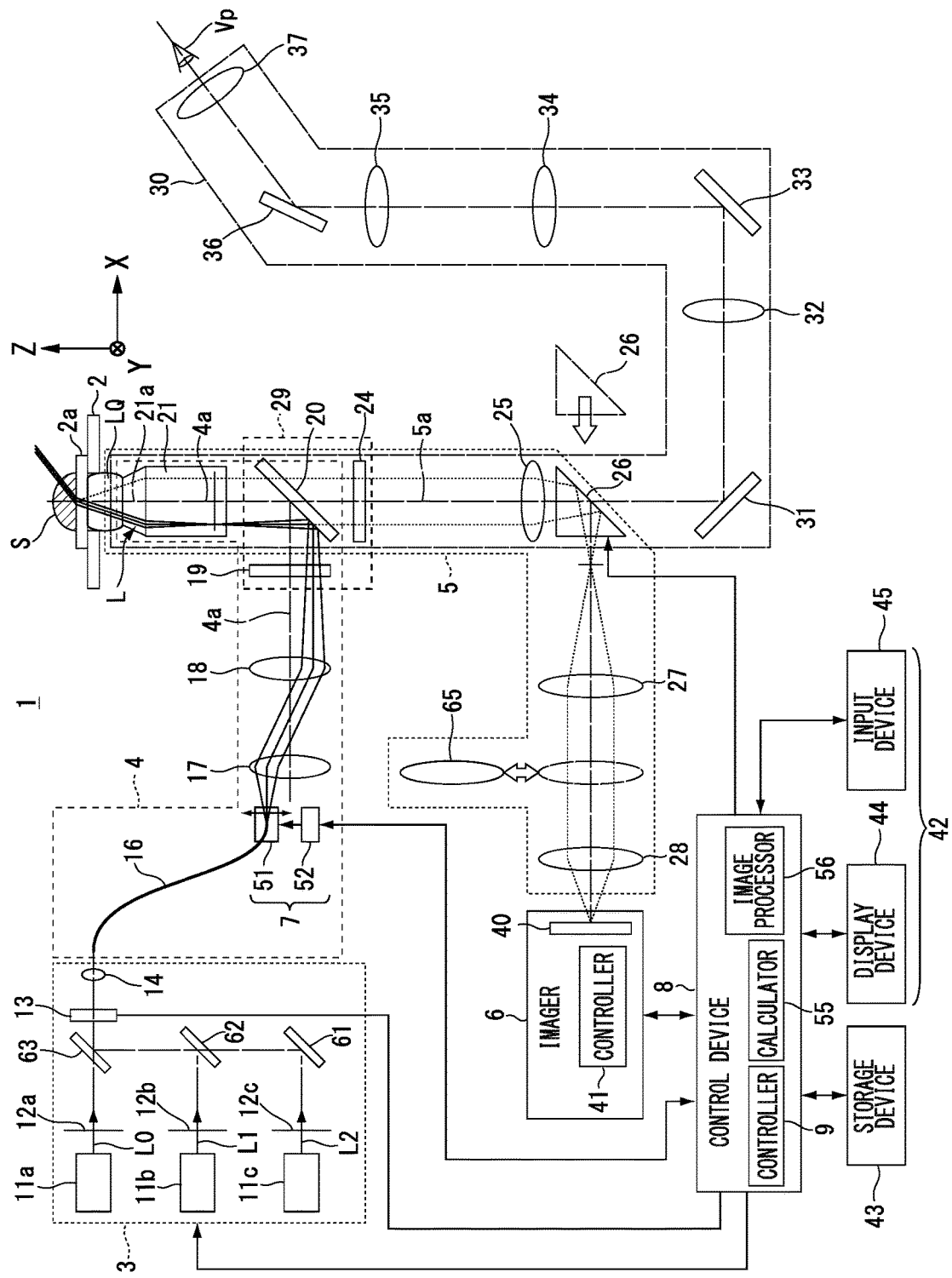
FIG. 7 is a diagram illustrating a microscope 1 according to a fourth embodiment.

The following describes a fourth embodiment. In the fourth embodiment, the same configurations as those in the above-mentioned embodiments are denoted with the same reference numerals, and the descriptions thereof are omitted or simplified. FIG. 7 is a diagram illustrating a microscope 1 according to the fourth embodiment. For example, the microscope according to the fourth embodiment is a microscope using single-molecule localization microscopy, such as STORM and PALM. The microscope according to the present embodiment is usable for both fluorescence observation of a specimen labeled with one kind of fluorescent substance and fluorescence observation of a specimen labeled with two or more kinds of fluorescent substances. For example, the microscope according to the present embodiment has a mode for generating a two-dimensional super-resolution image and a mode for generating a three-dimensional super-resolution image, and is able to switch the two modes, but may only have one of the two modes. In the fourth embodiment, a case where the number of kinds of fluorescence dyes (for example, reporter dyes) used for labeling is two is described, but the number of fluorescence dyes (for example, reporter dyes) may be one or three or more.

The specimen X may be the one that contains a live cell, the one that contains a cell fixed by a tissue fixing solution, such as a formaldehyde solution, or a tissue. A fluorescent substance may be a fluorescent dye such as a cyanine dye or a fluorescent protein. The fluorescent dye includes a reporter dye that emits fluorescence when irradiated with excitation light in a state of being activate (hereinafter referred to as "activated state"). The fluorescent dye may include an activator dye that activates the reporter dye when irradiated with activation light. When the fluorescent dye does not contain the activator dye, the reporter dye becomes activated when irradiated with the activation light. The fluorescent dye is a dye pair, for example, in which two types of cyanine dye are combined with each other, examples of the dye pair including a Cy3-Cy5 dye pair (Cy3 and Cy5 are registered trademarks), a Cy2-Cy5 dye pair (Cy2 and Cy5 are registered trademarks), a Cy3-Alexa Fluor 647 dye pair (Cy3 and Alexa Fluor are registered trademarks), and a single type of dye, such as Alexa Fluor 647 (Alexa Fluor is a registered trademark). The fluorescent protein is PA-GFP or Dronpa, for example.

In the fourth embodiment, the illumination optical system 4 irradiates a specimen S with excitation light having two kinds of wavelengths corresponding to fluorescent substances (for example, reporter dyes). The light source device 3 includes an activation light source 11a, an excitation light source 11b, an excitation light source 11c, a shutter 12a, a shutter 12b, a shutter 12c, a mirror 61, a dichroic mirror 62, and a dichroic mirror 63.

The activation light source 11a emits activation light L0 that activates a part of a fluorescent substance contained in the specimen S as illumination light. Note that the fluorescent substance herein contains a reporter dye and does not contain any activator dye. The reporter dye in the fluorescent substance becomes activated and ready for emitting fluorescence when irradiated with the activation light L0. The activation light L0 has a wavelength of 405 nm, for example. The fluorescent substance may contain the reporter dye and the activator dye. In this case, the activator dye activates the reporter dye upon irradiation with the activation light L0. The fluorescent substance may be a fluorescent protein such as PA-GFP or Dronpa, for example. The shutter 12a is disposed on the side of the activation light source 11a to which the light source 11a directs light. The shutter 12a is controlled by the controller 9, and is able to switch between the state that transmits the activation light L0 from the activation light source 11a and the state that blocks the activation light L0.

The excitation light source 11b emits, as illumination light, first excitation light L1 having a first wavelength. The shutter 12b is disposed on the side of the excitation light source 11b to which the light source 11b directs light. The shutter 12b is controlled by the controller 9, and is able to switch between the state that transmits the first excitation light L1 from the excitation light source 11b and the state that blocks the first excitation light L1. The excitation light source 11c emits, as illumination light, second excitation light L2 having a second wavelength different from the first wavelength. In this case, the second wavelength is shorter than the first wavelength. For example, the first wavelength is 647 nm, and the second wavelength is 561 nm. The shutter 12c is disposed on the side of the excitation light source 11c to which the light source 11c directs light. The shutter 12c is controlled by the controller 9, and is able to switch between the state that transmits the second excitation light L2 from the excitation light source 11c and the state that blocks the second excitation light L2.

The mirror 61 is disposed on the side of the shutter 12c to which the shutter 12c directs light. The second excitation light L2 that has passed through the shutter 12c is reflected by the mirror 61 to enter the dichroic mirror 62. The dichroic mirror 62 is disposed on the side of the shutter 12b to which the shutter 12b directs light. The dichroic mirror 62 has characteristics that transmit the second excitation light L2 and reflect the first excitation light L1. The first excitation light L1 that has been reflected by the dichroic mirror 62 and the second excitation light L2 that has passed through the dichroic mirror 62 pass through the same optical path to enter the dichroic mirror 63. The dichroic mirror 63 is disposed on the side of the shutter 12a to which the shutter 12a directs light. The dichroic mirror 63 has characteristics that reflect the first excitation light L1 and the second excitation light L2 and transmit the activation light L0. The first excitation light L1 and the second excitation light L2 pass through the same optical path as the activation light L0 to irradiate the specimen S therewith.

For example, the angle adjuster 7 may adjust the incident angle of illumination light depending on the wavelength of the illumination light. For example, the incident angle of illumination light may be adjusted to an incident angle optimum for the activation light L0, an incident angle optimum for the first excitation light L1, or an incident angle optimum for the second excitation light L2. An angle between the smallest angle and the largest angle among these angles may be set as the incident angle. When the specimen S is irradiated with the first excitation light L1, the incident angle of the illumination light may be set to an incident angle optimum for the wavelength of the first excitation light L1, and when the specimen S is irradiated with the second excitation light L2, the incident angle of the illumination light may be reset to an incident angle optimum for the wavelength of the second excitation light L2. The activation light L0 is not necessarily required to illuminate the specimen S from the oblique direction.

The image processor 56 uses imaging results of the imager 6 to perform image processing, including determining the centroid positions of individual images. The controller 9 controls the imager 6 to take images in a plurality of frame periods, and the image processor 56 generates a single image by using at least a part of the imaging results obtained in the frame periods. For example, the image processor 56 calculates, for each of a plurality of taken images, the centroid position of a fluorescence image (point image) included in the taken image. For example, the image processor 56 calculates the centroid position by performing Gaussian fitting on the distribution of pixel values in a region corresponding to the point image in the taken image. For example, the image processor 56 represents the centroid position of an image of fluorescence by a bright point, and generates a single image (for example, super-resolution image) by using (merging) at least a part of a plurality of bright points corresponding to a plurality of images of fluorescence included in a plurality of taken images.

The first observation optical system 5 includes an astigmatic optical system (for example, the cylindrical lens 65). The cylindrical lens 65 acts on at least a part of fluorescence from the specimen S, and generates astigmatism for at least a part of the fluorescence. Specifically, the astigmatic optical system such as the cylindrical lens 65 generates an astigmatic difference by generating astigmatism for at least a part of the fluorescence. The cylindrical lens 65 is provided to be insertable to and removable from an optical path between the specimen S and the imager 6 (for example, the imaging sensor 40). For example, the image processor 56 uses the astigmatism to calculate the position of a fluorescent substance in the depth direction of the specimen S (the direction of the optical axis 21a of the objective lens 21, that is, the direction of the optical axis 5a of the first observation optical system 5). For example, the image processor 56 is able to calculate the position of a fluorescent substance in the specimen S by elliptical Gaussian fitting. As illustrated in FIG. 7, the cylindrical lens 65 is provided to be insertable and removable.

Figure 8:
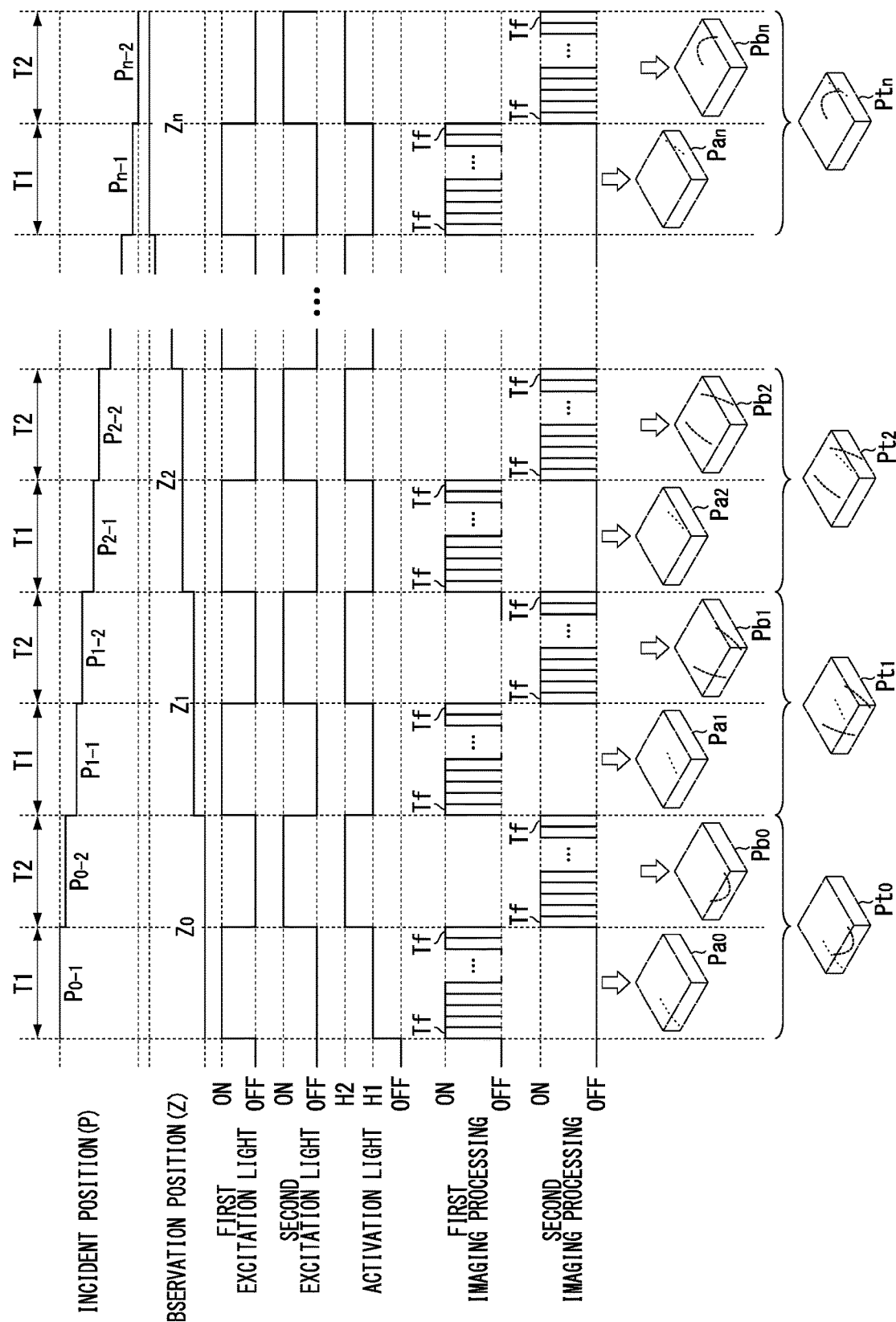
FIG. 8 is a diagram illustrating an example of a sequence of illumination and imaging according to the fourth embodiment.
Figure 9A:
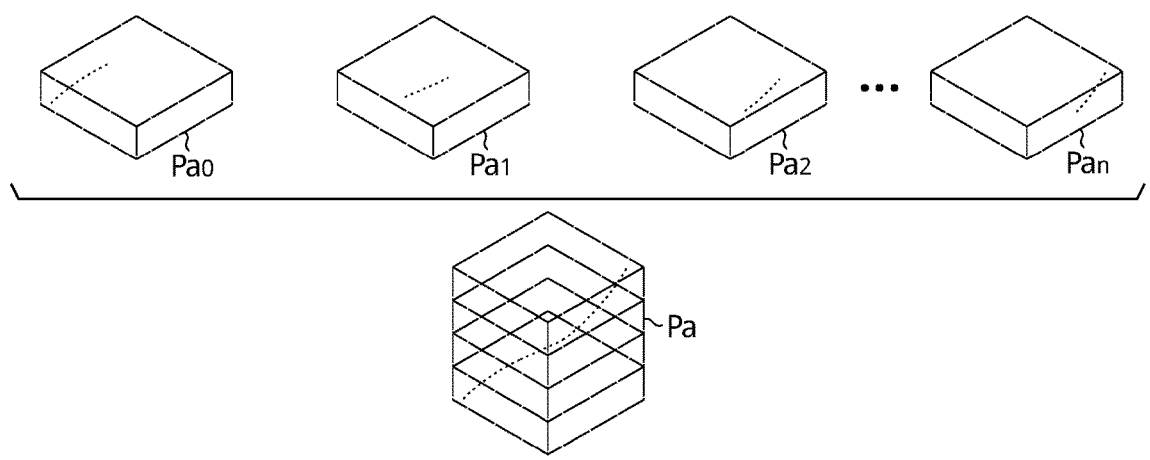
FIGS. 9A to 9C are each a diagram conceptually illustrating an example of images generated by an image processor.
Figure 9B:
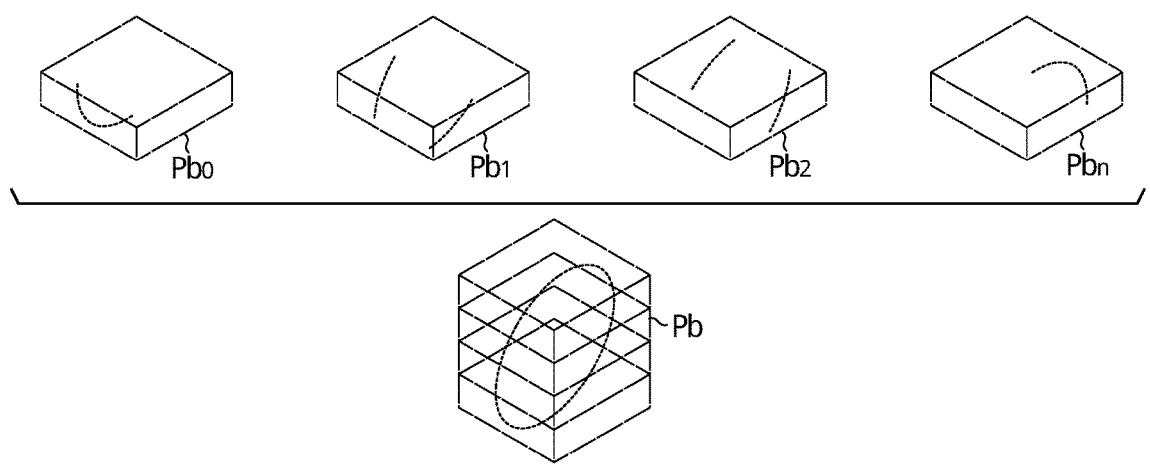
Figure 9C:
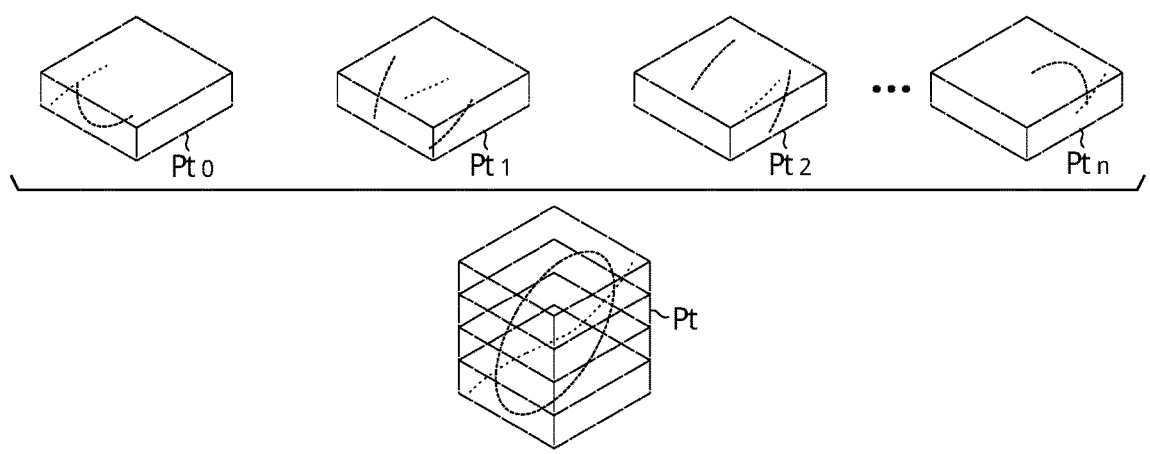

FIG. 8 is a diagram illustrating an example of a sequence of illumination and imaging according to the fourth embodiment. FIGS. 9A to 9C are each a diagram conceptually illustrating an example of images generated by the image processor 56. The following description assumes that the relation between the observation position and the incident position P illustrated in FIGS. 4A and 4B, FIG. 6, and the like is calculated by the calculator 55 in advance. The controller 9 moves the stage 2 along the optical axis 21a of the objective lens 21, and sets a predetermined observation position ($Z_0$ in FIG. 8). The controller 9 uses the relation between the observation position and the incident position P illustrated in FIGS. 4A and 4B, FIG. 6, and the like to control the driver 52 for the angle adjuster 7, thereby moving the holding member 51 such that the incident position becomes $P_{0-1}$ in a first image generation period T1 and moving the holding member 51 such that the incident position becomes $P_{0-2}$ in a second image generation period T2. The controller 9 executes an imaging sequence as follows at the predetermined observation position ($Z_0$ in FIGS. 9A to 9C).

In the image generation period T1, the controller 9 irradiates the specimen S with first excitation light (first excitation light L1) but not with second excitation light (second excitation light L2). In the image generation period T1, the controller 9 irradiates the specimen S with activation light L0 as well. The controller 9 controls the imager 6 to take an image in each of a plurality of frame periods Tf of the image generation period T1 (ON of the first imaging processing in FIG. 8). In the image generation period T2 next to the image generation period T1, the controller 9 irradiates the specimen S with the second excitation light but not with the first excitation light. In the image generation period T2, the controller 9 irradiates the specimen S with the activation light L0 as well. The controller 9 controls the imager 6 to take an image in each of a plurality of frame periods Tf of the image generation period T2 (ON of the second imaging processing in FIG. 8). For example, the intensity of the activation light L0 is adjusted depending on fluorescent substances. For example, the intensity of the activation light L0 is set to be higher when the specimen S is irradiated with the second excitation light than when the specimen S is irradiated with the first excitation light. For example, the controller 9 controls the acousto-optic element 13 to adjust the intensity of the activation light.

The image processor 56 generates a first image $Pa_0$ by using at least a part of the imaging results (for example, taken images) obtained by a plurality of pieces of the first imaging processing in the image generation period T1. The image processor 56 generates a second image $Pb_0$ by using at least a part of the imaging results (for example, taken images) obtained by a plurality of pieces of the second imaging processing in the image generation period T2. Two kinds of fluorescent substances (for example, reporter dyes) are labeled for different organelles in the specimen S, and images of the different organelles are obtained from the first image $Pa_0$ and the second image $Pb_0$. For example, the image processor 56 is able to generate a single image $Pt_0$ as illustrated in FIG. 9C by combining the first image $Pa_0$ and the second image $Pb_0$.

The image processor 56 may generate a single image $Pt_0$ without using the first image $Pa_0$ or the second image $Pb_0$. For example, the image processor 56 may generate a single image $Pt_0$ by using at least a part of the imaging results obtained by a plurality of pieces of the first imaging processing and at least a part of the imaging results obtained by pieces of the second imaging processing. The image processor 56 is not necessarily required to generate the image $Pt_0$.

Next, the controller 9 moves the stage 2 along the optical axis 21a of the objective lens 21 to set the next observation position ($Z_1$ in FIG. 8). The controller 9 controls the driver 52 for the angle adjuster 7 by using the relation between the observation position and the incident position P illustrated in FIGS. 4A and 4B, FIG. 6, and the like, thereby moving the holding member 51 such that the incident position becomes $P_{1-1}$ in the first image generation period T1 and moving the holding member 51 such that the incident position becomes $P_{1-2}$ in the second image generation period T2. Also at this observation position, the controller 9 executes the above-mentioned imaging sequence to obtain a first image $Pa_1$, a second image $Pb_1$, and an image $Pt_1$. In this manner, as illustrated in FIG. 8, first images $Pa_0$ to $Pa_n$, second images $Pb_0$ to $Pb_n$, and images $Pt_0$ to $Pt_n$ are obtained at the observation positions $Z_0$ to $Z_n$, respectively.

For example, as illustrated in FIG. 9A, the image processor 56 is able to generate a three-dimensional image Pa by using first images $Pa_0$ to $Pa_n$. As illustrated in FIG. 9B, the image processor 56 is able to generate a three-dimensional image Pb by using second images $Pb_0$ to $Pb_n$. For example, the image processor 56 is able to generate a three-dimensional image (for example, a three-dimensional image Pt in FIG. 9C) by combining the three-dimensional image Pa and the three-dimensional image Pb. As illustrated in FIG. 9C, the image processor 56 is able to generate an image $Pt_0$ by using the first image $Pa_0$ and the second image $Pb_0$, and is able to similarly generate images $Pt_1$ to $Pt_n$. The image processor 56 is also able to generate a three-dimensional image Pt by using the images $Pt_0$ to $Pt_n$. Each of the first images $Pa_0$ to $Pa_n$ and the second images $Pb_0$ to $Pb_n$ is a three-dimensional image, but is a two-dimensional image when the cylindrical lens 65 is retracted from the optical path in FIG. 7.

In the fourth embodiment, the incident angle of excitation light (first excitation light, second excitation light) with respect to a specimen is optimally set at each of the observation positions $Z_0$ to $Z_n$, and hence highly precise images are able to be obtained.

In the fourth embodiment, the stage 2 is operated, and the image generation period T1 and the image generation period T2 are executed at each of the observation positions $Z_0$ to $Z_n$. However, only the image generation period T1 may be executed at each of the observation positions $Z_0$ to $Z_n$. In this case, the stage 2 is operated again, and only the image generation period T2 is executed at each of the observation positions $Z_0$ to $Z_n$.

In single-molecule localization microscopy such as STORM and PALM, which are capable of generating high-resolution images, when at least one of an incident angle stage for illumination light with respect to a specimen and an objective lens is moved, it is particularly effective to change the incident angle of the illumination light with respect to the specimen. The resolution may decrease if the incident angle of the illumination light with respect to the specimen is not changed. As in the fourth embodiment, however, by appropriately changing the incident angle of the illumination light with respect to the specimen, for example, the distribution of light intensity corresponding to an image of fluorescence is able to be prevented from being distorted in single-molecule localization microscopy. Consequently, for example, the centroid position of an image of fluorescence is able to be determined with high accuracy, and a cross-sectional image of a thick specimen is able to be acquired with high resolution.

Fifth Embodiment

The following describes a fifth embodiment. In the fifth embodiment, the same configurations as those in the above-mentioned embodiments are denoted with the same reference numerals, and the descriptions thereof are omitted or simplified. In the fifth embodiment, the configuration of the microscope 1 is the same as in FIG. 1, but the operation of the controller 9 is different from that in the first embodiment. In the fifth embodiment, when the controller 9 moves at least one of the stage 2 and the objective lens 21, the controller 9 controls the imager 6 to take a plurality of images at different incident angles. For example, the controller 9 controls the imager 6 to take one or two or more images for one incident angle and also controls the imager 6 to take one or two or more images for each of a plurality of incident angles in a state in which the stage 2 and the objective lens 21 are disposed at first relative positions. The controller 9 may determine an incident angle corresponding to the first relative positions based on a plurality of images obtained at different incident angles. For example, the controller 9 may employ an incident angle corresponding to an image having the highest luminance value among the images obtained at different incident angles as an incident angle for the first relative positions. The image processor 56 may select an image used for image processing from among the images obtained at different incident angles. For example, the image processor 56 may select an image in which the luminance value falls within a predetermined range from among the images obtained at different incident angles, and perform image processing (for example, the processing of generating the first image $Pa_0$ illustrated in FIG. 8) by using only the selected image.

The controller 9 may control the imager 6 to take one or two or more images for one incident angle and also control the imager 6 to take one or two or more images for each of a plurality of incident angles in a state in which the stage 2 and the objective lens 21 are disposed at second relative positions different from the first relative positions. The image processor 56 may select an image in which the luminance value falls within a predetermined range among a plurality of images obtained at different incident angles, and perform image processing (for example, the processing of generating the first image $Pa_1$ illustrated in FIG. 8) by using only the selected image. Also for the second relative positions, the controller 9 may determine an incident angle corresponding to the second relative positions similarly to the first relative positions. The calculator 55 may use an incident angle for the first relative positions and an incident angle for the second relative positions to calculate an incident angle for third relative positions between the first relative positions and the second relative positions.

In the above-mentioned embodiments, the controller 9 includes, for example, a computer system. The controller 9 reads a computer program stored in the storage device 43, and executes various kinds of processing in accordance with the computer program. For example, the computer program causes a computer to execute control of a microscope that includes: an illumination optical system that irradiates a specimen with illumination light from an oblique direction; and an observation optical system including an objective lens, and that is capable of moving at least one of a stage to hold the specimen and the objective lens in the same direction as an optical axis of the objective lens, and the control includes changing, when moving at least one of the stage and the objective lens, the incident angle of the illumination light with respect to the specimen. This computer program may be provided by being recorded in a computer-readable storage medium.

The scope of the present invention is not limited to the aspects described according to the above-mentioned embodiments, for example. One or more of the requirements described in the above-mentioned embodiments and the like may be omitted. Note that requirements described in the above-mentioned embodiments and the like may be appropriately combined with one another. To the extent permitted by law, disclosures of all publications cited in the embodiments and the like described herein are hereby incorporated by references in its entirety.

DESCRIPTION OF REFERENCE SIGNS

1 Microscope
4 Illumination optical system
4a Optical axis
5 Image-forming optical system
7 Angle adjuster
9 Controller
16 Light guide member
21 Objective lens
45 Input device
52 Driver
55 Calculator
FP1 Focus plane
FP2 Focus plane
L Illumination light
LF1 Illumination field
LF2 Illumination field
LF3 Illumination field
PU1 Pupil plane
PU2 Pupil conjugate plane
S Specimen

What is claimed is:

1. A microscope, comprising:
an illumination optical system that irradiates a specimen with illumination light;
an observation optical system including an objective lens;
an adjuster that adjusts an incident angle of the illumination light with respect to the specimen; and
a controller, wherein:
the controller controls at least one of a stage to hold the specimen and the objective lens to change a distance between the stage and the objective lens,
the controller controls the adjuster to change the incident angle of the illumination light with respect to the specimen,
the controller controls the adjuster to set the incident angle of the illumination light with respect to the specimen to a first angle when the distance between the stage and the objective lens is a first distance, and
the controller controls the adjuster to set the incident angle to a second angle when the distance is a second distance.

2. The microscope according to claim 1, wherein the controller moves at least one of the stage and the objective lens in an optical axis direction of the objective lens to change the distance between the stage and the objective lens.

3. The microscope according to claim 1, wherein the controller controls the adjuster to change the incident angle in accordance with a wavelength of the illumination light.

4. The microscope according to claim 1, wherein the first angle is smaller than the second angle when the first distance is smaller than the second distance.

5. The microscope according to claim 1, wherein the illumination optical system comprises the objective lens, and causes the illumination light to enter the specimen through the objective lens.

6. The microscope according to claim 1, wherein the controller controls the adjuster to change the incident angle of the illumination light based on information related to the incident angle corresponding to a position of the stage.

7. The microscope according to claim 1, comprising an imager that takes an image formed by the observation optical system, wherein
the controller controls the imager to take a plurality of images with different incident angles at the first distance and the second distance.

8. The microscope according to claim 1, wherein
the illumination light includes activation light to activate a part of a fluorescent substance included in the specimen and excitation light to excite at least a part of the activated fluorescent substance, and
the controller changes the incident angle of the excitation light with respect to the specimen when moving at least one of the stage and the objective lens.

9. A microscope, comprising:
an illumination optical system that irradiates a specimen with illumination light;
an observation optical system including an objective lens;
an adjuster that adjusts an incident angle of the illumination light with respect to the specimen; and
a controller, wherein:
the controller controls at least one of a stage to hold the specimen and the objective lens to change a distance between the stage and the objective lens,
the controller controls the adjuster to change the incident angle of the illumination light with respect to the specimen,
the illumination optical system comprises the objective lens, and causes the illumination light to enter the specimen through the objective lens, and
the adjuster changes the incident angle by adjusting an incident position of the illumination light on a pupil plane of the objective lens.

10. The microscope according to claim 9, wherein the adjuster changes the incident position in a plane orthogonal to an optical axis of the objective lens.

11. A microscope, comprising:
an illumination optical system that irradiates a specimen with illumination light;
an observation optical system including an objective lens;
an adjuster that adjusts an incident angle of the illumination light with respect to the specimen; and
a controller, wherein:
the controller controls at least one of a stage to hold the specimen and the objective lens to change a distance between the stage and the objective lens,
the controller controls the adjuster to change the incident angle of the illumination light with respect to the specimen,
the illumination optical system comprises the objective lens, and causes the illumination light to enter the specimen through the objective lens, and
the controller controls the adjuster to change the incident angle based on information related to the incident angle corresponding to a position of the objective lens.

12. The microscope according to claim 11, comprising an input/output device, wherein
the controller outputs a plurality of calculation methods for the information related to the incident angle corresponding to the position of the objective lens to the input/output device such that the calculation methods are selectable, and the controller calculates the information related to the incident angle corresponding to the position of the objective lens based on the calculation method input from the input/output device, and controls the adjuster based on the calculated information.

13. A microscope, comprising:
an illumination optical system that irradiates a specimen with illumination light;
an observation optical system including an objective lens;
an adjuster that adjusts an incident angle of the illumination light with respect to the specimen; and
a controller, wherein:
the controller controls at least one of a stage to hold the specimen and the objective lens to change a distance between the stage and the objective lens,
the controller controls the adjuster to change the incident angle of the illumination light with respect to the specimen,
the illumination optical system comprises the objective lens, and causes the illumination light to enter the specimen through the objective lens, and
the controller determines information related to the incident angle corresponding to a position of the objective lens based on information related to a first incident angle corresponding to a predetermined first position of the objective lens and information related to a second incident angle corresponding to a second position different from the first position, and controls the adjuster based on the determined information.

14. A microscope, comprising:
an illumination optical system that irradiates a specimen with illumination light;
an observation optical system including an objective lens;
an adjuster that adjusts an incident angle of the illumination light with respect to the specimen;
an input/output device; and
a controller, wherein:
the controller controls at least one of a stage to hold the specimen and the objective lens to change a distance between the stage and the objective lens,
the controller controls the adjuster to change the incident angle of the illumination light with respect to the specimen,
the controller controls the adjuster to change the incident angle of the illumination light based on information related to the incident angle corresponding to a position of the stage,
the controller outputs a plurality of calculation methods for the information related to the incident angle corresponding to the position of the stage to the input/output device such that the calculation methods are selectable, and
the controller calculates the information related to the incident angle corresponding to the position of the stage based on the calculation method input from the input/output device, and controls the adjuster based on the calculated information.

15. A microscope, comprising:
an illumination optical system that irradiates a specimen with illumination light;
an observation optical system including an objective lens;
an adjuster that adjusts an incident angle of the illumination light with respect to the specimen; and
a controller, wherein:
the controller controls at least one of a stage to hold the specimen and the objective lens to change a distance between the stage and the objective lens,
the controller controls the adjuster to change the incident angle of the illumination light with respect to the specimen,
the controller controls the adjuster to change the incident angle of the illumination light based on information related to the incident angle corresponding to a position of the stage, and
the controller determines information related to the incident angle corresponding to the position of the stage based on information related to a first incident angle corresponding to a predetermined first position of the stage and information related to a second incident angle corresponding to a second position different from the first position, and controls the adjuster based on the determined information.

16. A microscope, comprising:
an illumination optical system that irradiates a specimen with illumination light;
an observation optical system including an objective lens;
an adjuster that adjusts an incident angle of the illumination light with respect to the specimen; and
a controller, wherein:
the controller controls at least one of a stage to hold the specimen and the objective lens to change a distance between the stage and the objective lens,
the controller controls the adjuster to change the incident angle of the illumination light with respect to the specimen,
the illumination optical system comprises a light guide member that guides the illumination light, and
the adjuster changes the incident angle by moving a position of the light guide member.

17. The microscope according to claim 16, wherein information related to the incident angle with respect to the specimen includes information related to the position of the light guide member.

18. A microscope, comprising:
an illumination optical system that irradiates a specimen with illumination light;
an observation optical system including an objective lens; and
a controller,
the controller controlling at least one of a stage to hold the specimen and the objective lens to change a distance between the stage to hold the specimen and the objective lens, and changing an incident position of the illumination light on a pupil plane of the objective lens.

19. A microscope, comprising:
an illumination optical system that irradiates a specimen with illumination light;
an observation optical system including an objective lens;
an imager that takes an image formed by the observation optical system; and
a controller,
the controller controlling at least one of a stage to hold the specimen and the objective lens to change a distance between the stage to hold the specimen and the objective lens, and changing an incident angle of the illumination light with respect to the specimen such that a luminance value of the image taken by the imager falls within a predetermined range.

20. A microscope, comprising:
an illumination optical system that irradiates a specimen with illumination light;
an observation optical system including an objective lens;
an imager that takes an image formed by the observation optical system; and a controller, the controller controlling at least one of a stage to hold the specimen and the objective lens to change a distance between the stage to hold the specimen and the objective lens, and changing an incident angle of the illumination light with respect to the specimen based on a luminance value of the image taken by the imager.

21. A microscope, comprising:

an illumination optical system that irradiates a specimen with illumination light;

an observation optical system including an objective lens;

an adjuster that adjusts an incident angle of the illumination light with respect to the specimen; and a controller, controlling the adjuster to change the incident angle of the illumination light with respect to the specimen based on a distance between the specimen and the objective lens.

22. An observation method using a microscope including:

an illumination optical system that irradiates a specimen with illumination light; and an observation optical system including an objective lens, the observation method comprising:

correcting a change of an observation position to change an incident angle of the illumination light with respect to the specimen.

* * * * *